(12) United States Patent
Raja (10) Patent No.: US 11,344,458 B2
(45) Date of Patent: May 31, 2022

(54) ELECTRIC VEHICLE

(71) Applicant: Suzuki Motor Corporation, Hamamatsu (JP)

(72) Inventor: Gopinath Raja, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 16/984,644

(22) Filed: Aug. 4, 2020

(65) Prior Publication Data

US 2021/0059878 A1 Mar. 4, 2021

(30) Foreign Application Priority Data

Aug. 27, 2019 (JP) .............................. JP2019-154839

(51) Int. Cl.
*A61G 5/04* (2013.01)

(52) U.S. Cl.
CPC ....................................... *A61G 5/04* (2013.01)

(58) Field of Classification Search
CPC .................................. A61G 5/04; A61G 5/045
See application file for complete search history.

(56) References Cited

U.S. PATENT DOCUMENTS

| | | | | |
|---|---|---|---|---|
| 4,825,971 A * | 5/1989 | Bernstein | ............... | A61G 5/045 180/65.1 |
| 2003/0184054 A1* | 10/2003 | Wang | ....................... | A61G 5/00 280/651 |
| 2010/0084831 A1* | 4/2010 | Wang | ................... | B60N 2/3065 280/39 |
| 2010/0117328 A1* | 5/2010 | Johnson | ................. | A61G 5/045 280/250.1 |
| 2018/0078431 A1* | 3/2018 | Chen | ........................ | A61G 3/02 |
| 2020/0000656 A1* | 1/2020 | Hirata | ............... | B60N 2/01508 |
| 2020/0000657 A1* | 1/2020 | Kim | ....................... | A61G 5/042 |
| 2020/0039288 A1* | 2/2020 | Hirata | ..................... | A61G 5/04 |

(Continued)

FOREIGN PATENT DOCUMENTS

| | | |
|---|---|---|
| JP | H1085268 A | 4/1998 |
| JP | 2002233007 A | 8/2002 |

(Continued)

OTHER PUBLICATIONS

French Search Report for Application No. FR2006582 dated Dec. 3, 2021, 7 pages.

*Primary Examiner* — Jeffrey J Restifo
(74) *Attorney, Agent, or Firm* — Lerner, David, Littenberg, Krumholz & Mentlik, LLP (57) ABSTRACT

The present invention relates to an electric vehicle. The electric vehicle includes: a mobile base capable of traveling by an electromotive drive; and a battery capable of supplying electric power used in the electromotive drive. The mobile base includes: a front base having a front wheel; and a rear base having a rear wheel, the front and rear bases are configured to be capable of moving relative to each other so as to be changeable between an expanded state in which a wheelbase is expanded, and a contracted state in which the wheelbase is more contracted than in the expanded state, the front base includes a receiving portion capable of receiving the battery, and the receiving portion has a front opening formed in a front-end portion of the front base or a rear opening formed in a rear-end portion of the front base.

3 Claims, 7 Drawing Sheets

(56) References Cited

U.S. PATENT DOCUMENTS

| | | | |
|---|---|---|---|
| 2020/0139874 A1* | 5/2020 | Raja | B60P 3/423 |
| 2020/0237591 A1* | 7/2020 | Choi | B60W 30/09 |
| 2020/0268577 A1* | 8/2020 | Lau | G05D 1/0212 |
| 2020/0317049 A1* | 10/2020 | Raja | B62D 11/04 |
| 2020/0397633 A1* | 12/2020 | Xu | A61G 5/1081 |
| 2021/0045958 A1* | 2/2021 | Lee | A61G 5/14 |
| 2021/0059878 A1* | 3/2021 | Raja | A61G 5/04 |
| 2021/0059891 A1* | 3/2021 | Raja | B60L 15/20 |
| 2021/0061396 A1* | 3/2021 | Wada | A61H 3/04 |
| 2021/0085541 A1* | 3/2021 | Takei | H04N 5/247 |
| 2021/0089037 A1* | 3/2021 | Fukuoka | G05D 1/0214 |
| 2021/0145666 A1* | 5/2021 | Son | A61G 5/125 |
| 2021/0145670 A1* | 5/2021 | Son | A61G 5/128 |
| 2021/0145671 A1* | 5/2021 | Kim | A61G 5/04 |
| 2021/0145672 A1* | 5/2021 | Son | A61G 5/04 |
| 2021/0145673 A1* | 5/2021 | Son | A61G 5/128 |

FOREIGN PATENT DOCUMENTS

| | | |
|---|---|---|
| JP | 2003237380 A | 8/2003 |
| JP | 2016168153 A | 9/2016 |
| WO | 2016170364 A1 | 10/2016 |

* cited by examiner

ELECTRIC VEHICLE

CROSS-REFERENCE TO RELATED APPLICATIONS

This application claims the benefit of the filing date of Japanese Patent Application No. 2019-154839, filed on Aug. 27, 2019, the disclosure of which is hereby incorporated herein by reference.

BACKGROUND OF THE INVENTION

Technical Field

The present invention relates to an electric vehicle including a mobile base configured to be capable of traveling by an electromotive drive, and a battery configured to be capable of supplying electric power used in the electromotive drive.

Background Art

As means of transportation for users, such as the elderly, people in need of care, and/or the like, an electric vehicle, such as an electric-powered wheelchair, an electric-powered cart, or the like that can travel by driving means, such as a motor or the like is becoming popular. The electric vehicle may be called a "mobility scooter". The electric vehicle typically includes a mobile base configured to be capable of traveling by an electromotive drive, and a seat having a seating portion and arranged on the mobile base, and the user can move in a state of sitting on the seating portion of the seat of the electric vehicle. The electric vehicle includes a battery configured to be capable of supplying electric power used in the electromotive drive. The battery may be mounted on the mobile base.

An electric vehicle cited as one example of the above electric vehicle, includes: a pair of left and right frame members; a single-seater seat supported on the pair of frame members; a floor laid on the pair of frame members on the lower front side of the single-seater seat; a pair of left and right front wheels configured as handled wheels and arranged on the front side of the floor; a pair of left and right rear wheels configured as drive wheels driven by a power unit and arranged on the lower rear portion of the single-seater seat; a plurality of secondary cells supplying electric power to the power unit; and a cell case received between the pair of frame members in a main region of the floor. In the electric vehicle, the cell case has a height substantially equal to the height of the pair of frame members, and the plurality of secondary cells are arranged in the cell case. The electric vehicle includes a charging apparatus for charging the secondary cells, and electric power for the charging is supplied to the charging apparatus from an external power source via a cord for charging (for example, see Japanese Patent Publication JP 2003-237380 A).

SUMMARY OF THE INVENTION

Technical Problem

In one example of the electric vehicle described above, the rate of the space occupied by the secondary cell, that is to say, the battery in the electric vehicle, tends to be increased to secure the charging capacity of the battery. Therefore, the electric vehicle may be upsized for the occupying space of the battery.

In one example of the electric vehicle described above, the battery is not configured so as to be attachable and removable on the electric vehicle for the charging thereof. Therefore, in the electric vehicle, in order to charge the battery, the electric vehicle must be moved to a place near the external power source for supplying electric power to the charging apparatus, and the charging apparatus must be connected to the external power source via the cord for charging. However, the charging operation as above is troublesome. Meanwhile, when the electric vehicle is configured such that the battery is attachable and removable, in the electric vehicle, the battery can be independently moved to a place near the external power source in a state of being removed from the electric vehicle, and the battery can be independently charged. The charging operation as above is efficient compared to the charging operation of one example of the electric vehicle. However, in the electric vehicle, the operation of attaching and removing the battery having a heavy weight, that is to say, the operation of replacing the battery, may be complicated. Therefore, it is important that the battery can be efficiently replaced.

In view of the above circumstances, it is desired that the electric vehicle can be downsized, the battery can be efficiently replaced, and the battery can be efficiently charged in the electric vehicle.

Solution to the Problem

To solve the problems as described above, an electric vehicle according to one aspect includes: a mobile base configured to be capable of traveling by an electromotive drive; a seat arranged on the mobile base and including a seating portion having a sitting surface; and a battery configured to be capable of supplying electric power used in the electromotive drive, the mobile base includes: a front base having a front wheel; and a rear base arranged rearward of the front base and having a rear wheel, the front and rear bases are configured to be moveable relative to each other such that the mobile base is changeable between an expanded state in which a wheelbase between the front wheel and the rear wheel is expanded, and a contracted state that the wheelbase is more contracted than in the expanded state, the front base includes a receiving portion capable of receiving the battery, the receiving portion has a front opening formed in a front-end portion of the front base or a rear opening formed in a rear-end portion of the front base, and the front opening or the rear opening is formed such that the battery is receivable in the receiving portion and the battery is removable from the receiving portion.

Advantageous Effects of the Invention

In the electric vehicle according to one aspect, the electric vehicle can be downsized, the battery can be efficiently replaced, and the battery can be efficiently charged.

DETAILED DESCRIPTION

Electric vehicles according to First and Second Embodiments will be described below. Each of the electric vehicles according to the Embodiments is a single-seater vehicle, and the electric vehicle is configured such that a seat installed thereon is opened to the outside of the electric vehicle. For example, the electric vehicle may be an electric-powered wheelchair, an electric-powered cart, or the like, and in particular, the electric vehicle may be a single-seater electric-powered wheelchair, a single-seater electric-powered cart, or the like. However, the electric vehicle is not limited to those configurations. The electric vehicle is simply called a "vehicle" below, as necessary.

In the drawings used to explain the Embodiments, directions defined based on the vehicle are indicated as follows. Specifically, the vehicle front side and the vehicle rear side are indicated by a single-headed arrow F and a single-headed arrow R respectively. Therefore, the vehicle front-rear direction is indicated by the single-headed arrow F and the single-headed arrow R. The vehicle width direction is indicated by a double-headed arrow W. The vehicle upper side and the vehicle lower side are indicated by a single-headed arrow U and a single-headed arrow L respectively. Therefore, the vehicle upper-lower direction is indicated by the single-headed arrow U and the single-headed arrow L.

First Embodiment

The electric vehicle according to First Embodiment will be described.

Outline of Electric Vehicle

First, with reference to FIGS. 1 to 7, the outline of the electric vehicle according to this Embodiment will be described. As shown in FIGS. 1 to 7, the vehicle includes a mobile base 10 configured to be capable of traveling by an electromotive drive. As shown in FIGS. 1 to 4, the vehicle includes one seat 20 arranged on the mobile base 10. The seat 20 includes a seating portion 22 having a sitting surface 21 configured such that the user can sit thereon. In particular, the seat 20 may be for one person. However, the seat of the vehicle is not limited to the above. The vehicle also includes a battery 30 configured to be capable of supplying electric power used in the electromotive drive.

As shown in FIGS. 1 to 6, the mobile base 10 includes two front wheels 11, and two rear wheels 12 positioned so as to be spaced apart from those front wheels 11 to the vehicle rear side. The front wheels 11 and the rear wheels 12 are traveling wheels of the vehicle. However, the mobile base only needs to include at least one front wheel and two or more rear wheels, or include two or more front wheels and at least one rear wheel.

Figure 1:
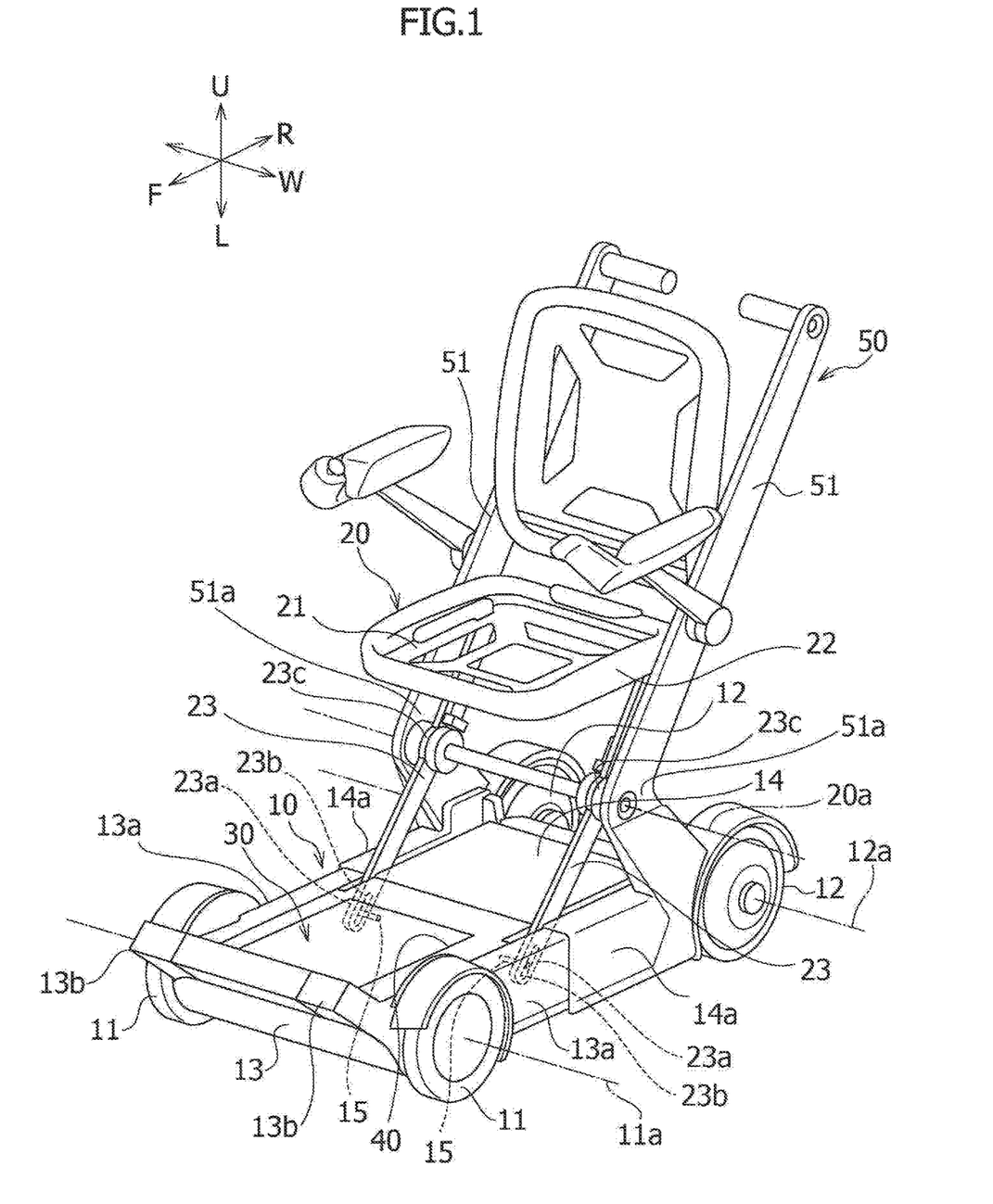
FIG. 1 is a front perspective view schematically showing an electric vehicle according to a First Embodiment in an unfolded state.
Figure 2:
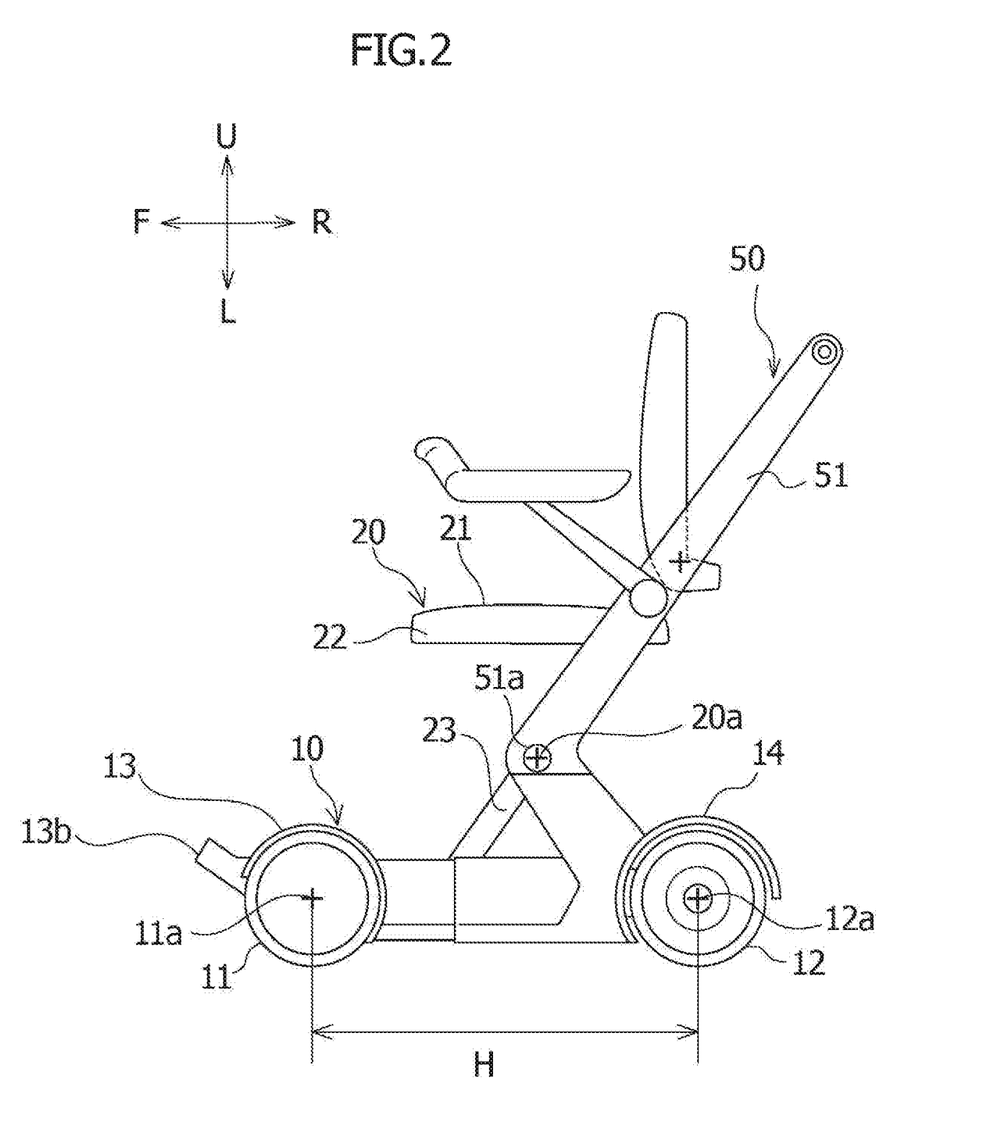
FIG. 2 is a side view schematically showing the electric vehicle according to the First Embodiment in the unfolded state.
Figure 3:
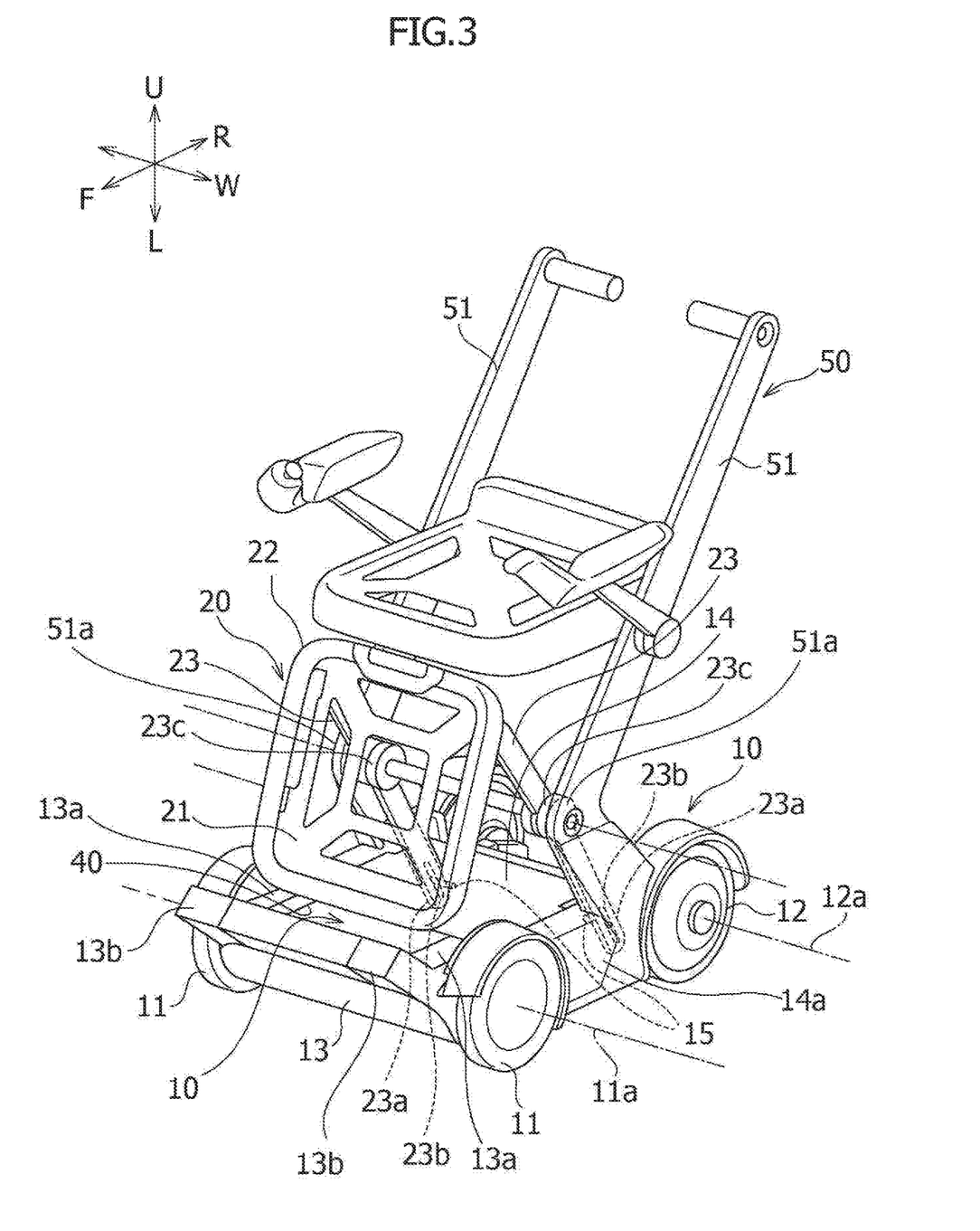
FIG. 3 is a front perspective view schematically showing the electric vehicle according to the First Embodiment in a folded state.
Figure 4:
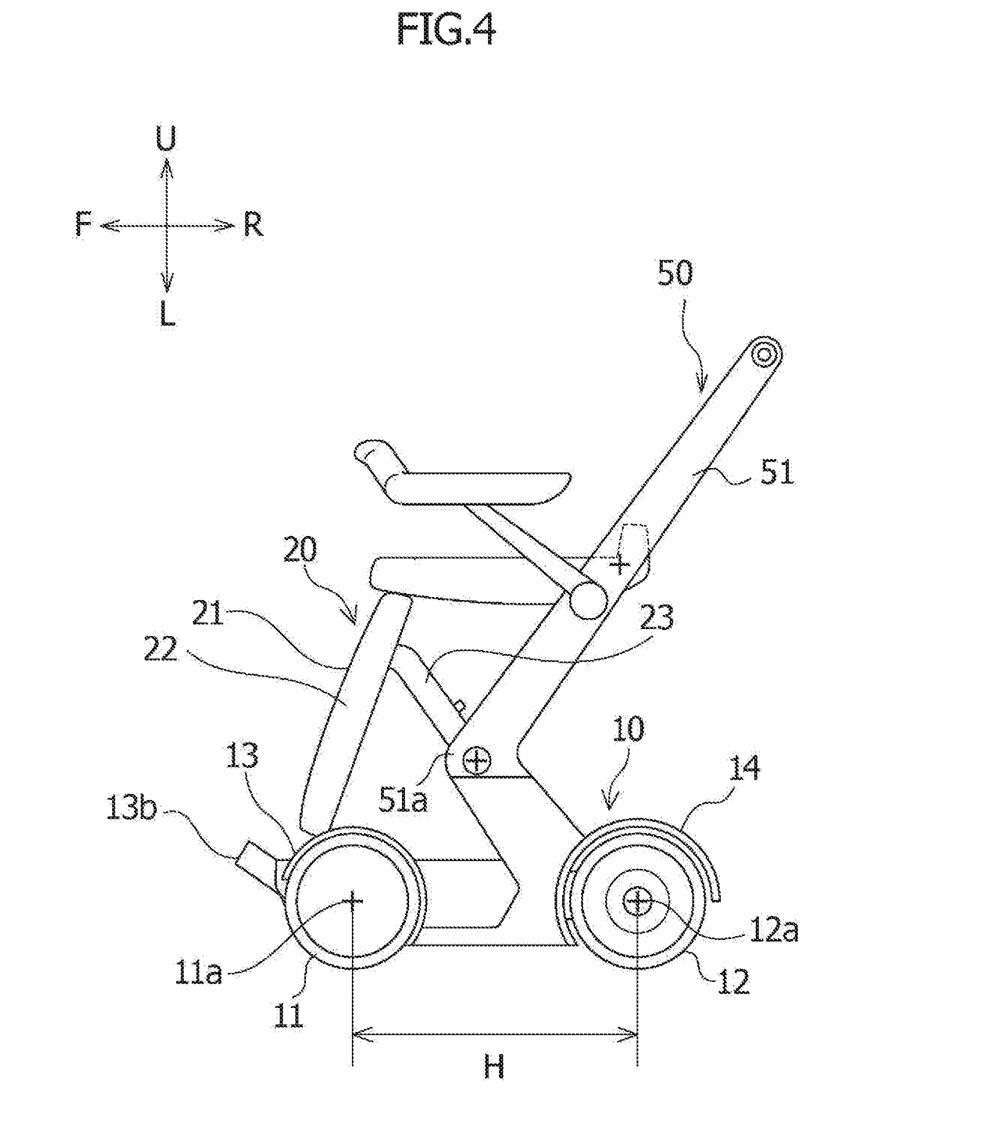
FIG. 4 is a side view schematically showing the electric vehicle according to the First Embodiment in the folded state.
Figure 5:
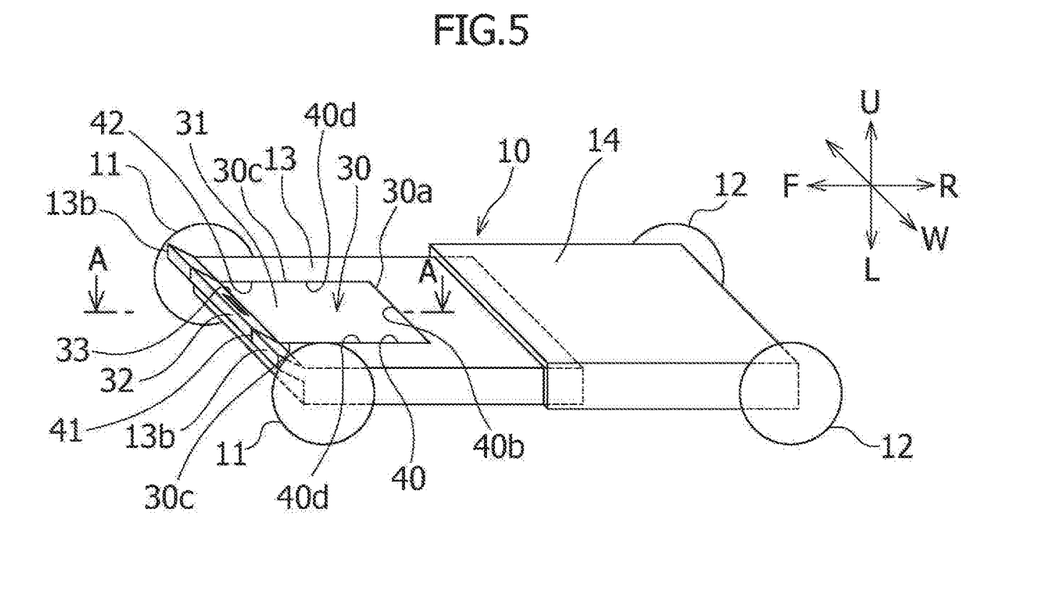
FIG. 5 is a front perspective view schematically showing a mobile base of the electric vehicle according to the First Embodiment in an expanded state.
Figure 6:
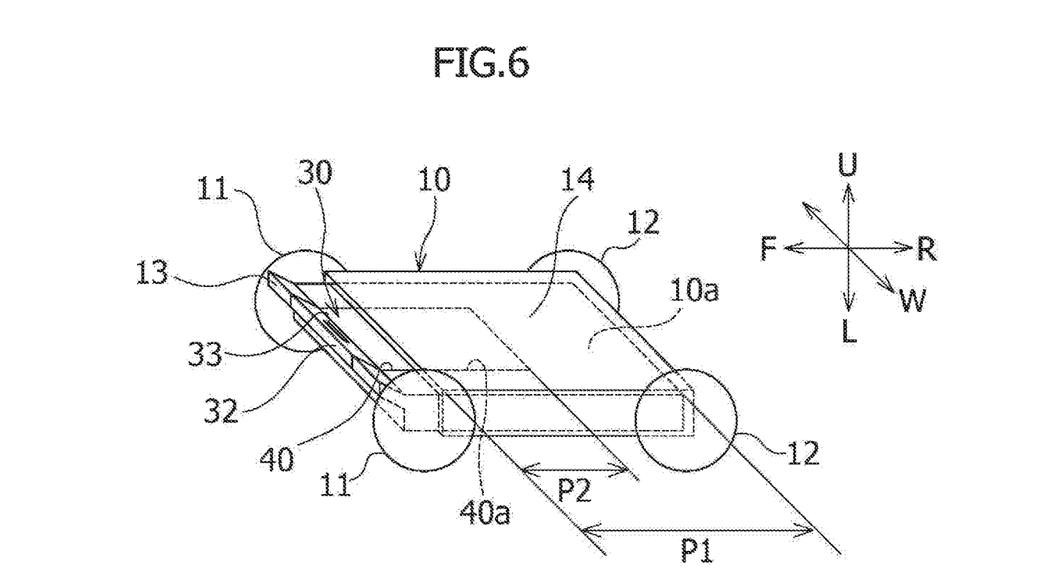
FIG. 6 is a front perspective view schematically showing the mobile base of the electric vehicle according to the First Embodiment in a contracted state.

The mobile base 10 includes a front base 13 having the front wheels 11, and a rear base 14 having the rear wheels 12. The rear base 14 is arranged on the vehicle rear side with respect to the front base 13. The front and rear bases 13 and 14 are configured to be moveable relative to each other so as to be changeable between the expanded state and the contracted state of the mobile base 10. As shown in FIGS. 1, 2, and 5, the expanded state of the mobile base 10 is a state in which a wheelbase H between the front wheels 11 and the rear wheels 12 of the mobile base 10 is expanded. As shown in FIGS. 3, 4, and 6, the contracted state of the mobile base 10 is a state in which the wheelbase H is more contracted than in the expanded state.

Figure 7:
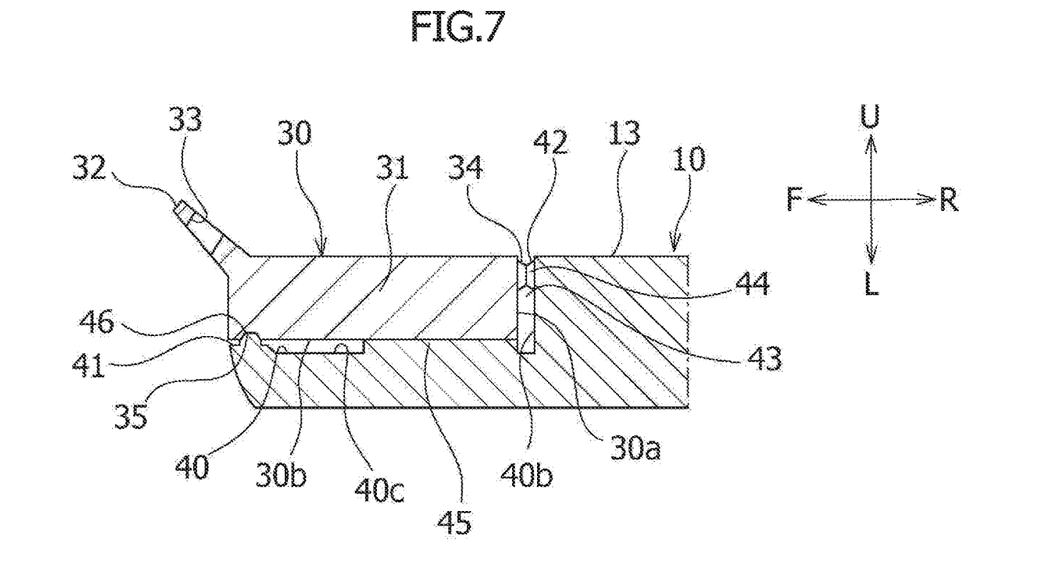
FIG. 7 is a cross-sectional view taken along line A-A in FIG. 5.

As shown in FIGS. 1, 3, and 5 to 7, the front base 13 includes a receiving portion 40 that can receive the battery 30. As shown in FIGS. 5 to 7, the receiving portion 40 has a front opening 41 formed in a front-end portion of the front base 13 in the vehicle front-rear direction. The front opening 41 is formed such that the battery 30 is receivable in the receiving portion 40 and the battery 30 is removable from the receiving portion 40.

The electric vehicle according to this Embodiment may be schematically configured as follows. As shown in FIG. 6, in the contracted state of the mobile base 10, a base overlapping region 10a in which the front and rear bases 13 and 14 overlap in the vehicle front-rear direction, is provided. The receiving portion 40 includes a battery overlapping zone 40a that overlaps with the base overlapping region 10a in the vehicle front-rear direction in the contracted state of the mobile base 10. A ratio P2/P1 of a length P2 of the battery overlapping zone 40a in the vehicle front-rear direction to a length P1 of the base overlapping region 10a in the vehicle front-rear direction is 0.5 or more and less than 1.

As shown in FIGS. 5 to 7, the receiving portion 40 has an upper opening 42. The upper opening 42 is formed in an upper-end portion of the front base 13 in the vehicle upper-lower direction, and the upper opening 42 is connected to the front opening 41 such that the battery 30 is receivable in the receiving portion 40 and the battery 30 is removable from the receiving portion 40. As shown in FIGS. 1 to 4, the vehicle includes a frame 50 arranged on the rear base 14.

Details of Mobile Base

In detail, the mobile base 10 may be configured as follows. With reference to FIGS. 1 to 6, in the mobile base 10, the rear wheels 12 are driven and the front wheels 11 are stopped to expand and contract the wheelbase H. In other words, when the wheelbase H is expanded, the rear wheels 12 are rotatably driven so as to move the rear base 14 to the vehicle rear side, and the front wheels 11 are stopped so as to keep the front base 13 at a fixed position. When the wheelbase H is contracted, the rear wheels 12 are rotatably driven so as to move the rear base 14 to the vehicle front side, and the front wheels 11 are stopped so as to keep the front base 13 at a fixed position.

However, the mobile base may be configured so as to drive the front wheels and stop the rear wheels in order to expand and contract the wheelbase. The mobile base may be configured such that the front wheels and the rear wheels are driven in an inverted manner with respect to each other to expand and contract the wheelbase.

The front and rear bases 13 and 14 of the mobile base 10 may substantially linearly slide relative to each other in the vehicle front-rear direction. In the base overlapping region 10a, the front base 13 is positioned on the vehicle lower side with respect to the rear base 14. When the front and rear bases 13 and 14 move relative to each other, the front base 13 passes through the inner portion of the rear base 14 in the base overlapping region 10a.

The difference in the length of the wheelbase H between the expanded state and the contracted state of the mobile base 10 may be equal to or more than a half of the maximum length of the seat 20 in the seat front-rear direction and equal to or less than the same maximum length. Note that the seat front-rear direction is a direction substantially orthogonal to a seat width direction and extending between a front surface and a rear surface of the seating portion 22. The seat width direction may substantially match with the vehicle width direction. The vehicle can stably travel while stably supporting the user that is riding when the mobile base 10 is in the expanded state, and the vehicle can be compact and make sharp turns when the mobile base 10 is in the contracted state.

As shown in FIGS. 1 to 4, the front base 13 of the mobile base 10 includes two front side members 13a arranged so as to be spaced apart from each other in the vehicle width direction. The two front wheels 11 are attached to front-end portions of the two front side members 13a in the vehicle front-rear direction so as to be rotatable about a rotation axis 11a extending in the vehicle width direction.

Each of the front side members 13a includes a turning shaft 15 formed so as to protrude to the vehicle width direction from a rear-end portion of the front side member 13a in the vehicle front-rear direction. Although details are described below, leg portions 23 of the seat 20 are attached to the turning shafts 15, respectively. The turning shafts 15 are arranged so as to avoid interference with the rear base 14 when the front and rear bases 13 and 14 move relative to each other.

As shown in FIG. 1, the turning shafts 15 may be respectively positioned in front-end portions of rear side members 14a described next in the vehicle front-rear direction in the expanded state of the mobile base 10. As shown in FIG. 3, the turning shafts 15 may be positioned near the rear wheels 12 in the contracted state of the mobile base 10 respectively.

As shown in FIGS. 1 and 3, the rear base 14 of the mobile base 10 includes the two rear side members 14a arranged to be spaced apart from each other in the vehicle width direction. The two rear wheels 12 are attached to rear-end portions of the two rear side members 14a in the vehicle front-rear direction respectively so as to be rotatable about a rotation axis 12a extending in the vehicle width direction.

Although not shown particularly clearly, a braking apparatus configured so as to be capable of braking the two front wheels 11 is mounted in the front base 13 of the mobile base 10. Driving motors for rotatably driving the rear wheels 12 respectively, are mounted on the rear base 14 of the mobile base 10. For example, the driving motors are arranged so as to be adjacent to the rear wheels 12 in the vehicle width direction, respectively, or the driving motors are built in the rear wheels 12, respectively. However, the driving motors are not limited thereto.

In the vehicle as above, the braking apparatus, a control apparatus, and the driving motors are electrically connected to the battery 30. The battery 30 can supply electric power to the braking apparatus, the control apparatus, and the driving motors. The control apparatus is connected to the braking apparatus and the driving motors. The control apparatus can control the battery 30 and the driving motors.

As shown in FIGS. 1 to 7, the front base 13 has two front ribs 13b positioned on the front-end portion thereof. The two front ribs 13b are spaced apart from each other in the vehicle width direction. The receiving portion 40 is positioned between the two front ribs 13b in the vehicle width direction. Each of the front ribs 13b is inclined so as to rise up to the vehicle upper side as the front ribs 13b approach the vehicle front side from the vehicle rear side. As shown in FIGS. 3, 4, and 6, in the contracted state of the mobile base 10, the front ribs 13b are positioned on the vehicle front side with respect to the front-end portion of the rear base 14 in the vehicle front-rear direction.

Details of Receiving Portion

In detail, the receiving portion 40 provided in the front base 13 of the mobile base 10, may be configured as follows. As shown in FIGS. 5 to 7, the receiving portion 40 has a cavity 43 formed so as to correspond to the battery 30. The cavity 43 communicates with the outside of the mobile base 10 via the front opening 41 and the upper opening 42.

The receiving portion 40 has a rear wall 40b positioned on a rear end thereof in the vehicle front-rear direction. The receiving portion 40 has a bottom wall 40c positioned on a lower end thereof in the vehicle upper-lower direction. The receiving portion 40 has two side walls 40d positioned on both ends thereof in the vehicle width direction respectively. The cavity 43 is defined by the rear wall 40b, the bottom wall 40c, and the two side walls 40d.

As shown in FIG. 7, the receiving portion 40 has a connection terminal 44 that can be electrically connected to a connection terminal 34 of the battery 30 described below. The connection terminal 44 is arranged on the rear wall 40b. The receiving portion 40 has a supporting portion 45 and an engaging protrusion portion 46 protruding to the vehicle upper side from the bottom wall 40c. Although details are described below, the supporting portion 45 supports the battery 30 from the vehicle lower side, and the engaging protrusion portion 46 can be engaged with the battery 30. The engaging protrusion portion 46 is positioned on the vehicle front side than the supporting portion 45.

Details of Battery

In detail, the battery 30 may be configured as follows. As shown in FIGS. 5 to 7, an upper end surface of the battery 30 in the vehicle upper-lower direction is formed so as to be substantially coplanar with an upper end surface of the front base 13 in the vehicle upper-lower direction. The battery 30 includes a battery main body 31 having a chargeable secondary cell (not shown).

The battery 30 includes a front handle portion 32 protruding from a front-end portion of the battery main body 31 in the vehicle front-rear direction so as to correspond to the front ribs 13b of the front base 13. The front handle portion 32 is inclined so as to rise up to the vehicle upper side as front handle portion 32 approaches the vehicle front side from the vehicle rear side. As shown in FIGS. 3, 4, and 6, in the contracted state of the mobile base 10, the front handle portion 32 is positioned on the vehicle front side with respect to the front-end portion of the rear base 14 in the vehicle front-rear direction. As shown in FIGS. 5 to 7, the battery 30 has a through hole 33 passing through the front handle portion 32. The through hole 33 extends in the vehicle width direction. The user can hold the front handle portion 32 in a state of putting a finger through the through hole 33.

As shown in FIGS. 5 and 6, the battery 30 has a rear wall 30a positioned on the rear end thereof in the vehicle front-rear direction. The rear wall 30a of the battery 30 faces the rear wall 40b of the receiving portion 40 in the vehicle front-rear direction. The battery 30 has a bottom wall 30b positioned on a lower end thereof in the vehicle upper-lower direction. The bottom wall 30b of the battery 30 faces the bottom wall 40c of the receiving portion 40 in the vehicle upper-lower direction. The rear wall 30a and the bottom wall 30b of the battery 30 configure the rear wall and the bottom wall of the battery main body 31 respectively. The battery 30 has two side walls 30c positioned on both ends thereof in the vehicle width direction, respectively. The two side walls 30c of the battery 30 face the two side walls 40d of the receiving portion 40 in the vehicle width direction, respectively.

As shown in FIG. 7, the battery 30 has the connection terminal 34 that can be connected to the connection terminal 44 of the receiving portion 40 of the mobile base 10. The connection terminal 34 is provided on the rear wall 30a of the battery 30. The connection terminal 34 is electrically connected to the secondary cell (not shown) of the battery main body 31. The supporting portion 45 of the receiving portion 40 supports the battery 30 from the vehicle lower side in a state of abutting the bottom wall 30b of the battery 30. The battery 30 has an engaging recessed portion 35 recessed toward the vehicle upper side from the bottom wall 30b. The engaging recessed portion 35 can be engaged with the engaging protrusion portion 46 of the receiving portion 40 so as to regulate the movement of the battery 30 with respect to the receiving portion 40.

Details of Seat

In detail, the seat 20 may be configured as follows. As shown in FIGS. 1 to 4, the seat 20 further includes the two leg portions 23 that can support the seating portion 22. The two leg portions 23 are arranged so as to be spaced apart from each other in the seat width direction. However, the seat may be configured so as to include at least one leg portion.

In the seat 20, the seating portion 22 moves to the vehicle front side by the movement of the leg portions 23 in accordance with the relative movement of the front and rear bases 13 and 14 in the vehicle front-rear direction for contracting the wheelbase H. The seating portion 22 moves to the vehicle rear side by the movement of the leg portions 23 in accordance with the relative movement of the front and rear bases 13 and 14 in the vehicle front-rear direction for expanding the wheelbase H.

As shown in FIGS. 1 and 2, the seating portion 22 is arranged in the sitting position in the expanded state of the mobile base 10. The seat 20 may be arranged such that the sitting surface 21 of the seating portion 22 is substantially along the vehicle horizontal direction in a state in which the seat 20 is in the sitting position. As shown in FIGS. 3 and 4, the seat 20 is arranged in the retracted position in the contracted state of the mobile base 10. The seat 20 may be arranged such that the sitting surface 21 of the seating portion 22 faces a plane extending in the vehicle upper-lower direction and the vehicle width direction at a predetermined angle in a state in which the seat 20 is in the retracted position. The absolute value of the angle is about 30 degrees or less. However, the angle of the sitting surface is not limited thereto.

As shown in FIGS. 1 to 4, a front-end zone of the seating portion 22 in the seat front-rear direction is a free end. In a state in which the seat 20 is in the sitting position, the front-end zone of the seating portion 22 is positioned on the vehicle front side with respect to a rear-end zone of the seating portion 22 in the seat front-rear direction, and the rear-end zone of the seating portion 22 is positioned so as to substantially match with a frame 50 in the vehicle front-rear direction. In a state in which the seat 20 is in the retracted position, the rear-end zone of the seating portion 22 is positioned on the vehicle upper side with respect to the front-end zone of the seating portion 22, and is positioned to be spaced apart from the frame 50 to the vehicle front side.

The leg portions 23 extend so as to be inclined toward the front side from the rear side in the seat front-rear direction as the leg portions 23 approach the lower side from the upper side in a seat upper-lower direction. Note that the seat upper-lower direction is a direction substantially orthogonal to the seat width direction and the seat front-rear direction. The leg portions 23 may respectively extend from side-end zones of the seating portion 22 in the seat width direction corresponding to the leg portions 23 to the lower side in the seat upper-lower direction, respectively.

The leg portions 23 include base attachment zones 23a configured so as to attach the leg portions 23 to the front base 13, respectively. The base attachment zones 23a are attached to the turning shafts 15 of the front side members 13a, respectively, so as to be capable of turning. More specifically, the base attachment zones 23a, respectively, have long holes 23b that serve as through holes in the vehicle width direction, respectively, such that the turning shafts 15 may be inserted therein, respectively. The long holes 23b extend along the longitudinal direction of the leg portions 23, respectively. When the front base 13 moves to the vehicle front-rear direction with respect to the rear base 14, the turning shafts 15, respectively, move in the long holes 23b along the longitudinal direction of the long holes 23b.

The leg portions 23 include frame attachment zones 23c, respectively, configured such that the leg portions 23 are attached to the frame 50, respectively, so as to be capable of turning with respect to the frame 50. The frame attachment zones 23c are positioned between the seating portion 22 and the base attachment zones 23a. The base attachment zones 23a of the leg portions 23 may be positioned on lower ends of the leg portions 23 in the seat upper-lower direction, respectively, and the frame attachment zones 23c of the leg portions 23 may be positioned in the middle of the leg portions 23 in the seat upper-lower direction, respectively.

In the seat 20 as above, the vehicle-front-side movement of the seating portion 22 is provided by the vehicle-rear-side movement of the base attachment zones 23a of the leg portions 23 and the vehicle-front-side turning of the leg portions 23 in accordance with the relative movement of the front and rear bases 13 and 14 in the vehicle front-rear direction for contracting the wheelbase H. The seating portion 22 can move to the retracted position from the sitting position by the vehicle-front-side movement.

By the relative movement of the front and rear bases 13 and 14 in the vehicle front-rear direction for expanding the wheelbase H, the vehicle-front-side movement of the base attachment zones 23a of the leg portions 23 and the vehicle-rear-side turning of the leg portions 23, are provided. As a result, the vehicle-rear-side movement of the seating portion 22 is provided. The seat 20 can move to the sitting position from the retracted position by the vehicle-rear-side movement.

Details of Frame

In detail, the frame 50 may be configured as follows. As shown in FIGS. 1 and 2, the frame 50 is arranged so as to be adjacent to the rear-end zone of the seating portion 22 of the seat 20 in the sitting position. The frame 50 includes the two support rods 51 arranged to be spaced apart from each other in the vehicle width direction. The two support rods 51 are arranged so as to correspond to the two rear side members 14a of the rear base 14 in the vehicle width direction respectively. The two support rods 51 are arranged so as to correspond to the two leg portions 23 of the seat 20 in the vehicle width direction respectively.

Lower end portions of the support rods 51 in the vehicle upper-lower direction are respectively attached to rear-end portions of the rear side members 14a in the vehicle front-rear direction corresponding to the support rods 51, respectively. The support rods 51 respectively include seat turning attachment portions 51a configured such that the frame attachment zones 23c of the leg portions 23 of the seat 20 corresponding to the support rods 51 respectively, can be attached thereto, respectively. The frame attachment zones 23c are attached to the seat turning attachment portions 51a respectively so as to be capable of turning about a turning axis 20a extending in the vehicle width direction.

The seat turning attachment portions 51a are arranged between a front end and a rear end of the rear base 14 in the vehicle front-rear direction. In particular, as shown in FIGS. 1 and 2, the seat turning attachment portions 51a may be respectively arranged on lower-side regions of the support rods 51 in the vehicle upper-lower direction, positioned on the vehicle lower side with respect to the seating portion 22 of the seat 20 in the sitting position. The lower-side regions of the support rods 51 may be formed in a bending manner so as to protrude toward the vehicle front side in substantially triangular shapes, respectively. In this case, the seat turning attachment portions 51a may be respectively positioned at apex portions of the lower-side regions protruding toward the vehicle front side in substantially triangular shapes, respectively.

Unfolded State and Folded State of Electric Vehicle

The unfolded state and the folded state of the electric vehicle will be described. As shown in FIGS. 1 and 2, the vehicle is in the unfolded state when the mobile base 10 is in the expanded state and the seat 20 is in the sitting position. In the unfolded state, the vehicle can travel while the user is riding the vehicle. In the unfolded state, the vehicle can also travel when the user, an assistant, or the like push the vehicle by hand while being on the vehicle rear side thereof. The vehicle in the unfolded state can be used as a wheelchair, a cart, and/or the like.

As shown in FIGS. 3 and 4, the vehicle is in the folded state when the mobile base 10 is in the contracted state and the seat 20 is in the retracted position as described above. In the folded state, the vehicle can travel when the user pushes the vehicle by hand while being on the vehicle rear side thereof. The vehicle in the folded state can be used as a walking assistance vehicle, a shopping cart, a hand cart, and/or the like.

Method for Attaching and Removing Battery

A method for attaching and removing the battery 30 will be described. First, an operation for receiving the battery 30 in the receiving portion 40 will be described. In each of the expanded and contracted states of the mobile base 10, the battery 30 can be received in the receiving portion 40 through the front opening 41 while moving from the vehicle front side toward the vehicle rear side. At a midway time point of the receiving operation, the battery 30 runs onto the engaging protrusion portion 46 or moves while passing through the upper side of the engaging protrusion portion 46. At the time point at which the receiving operation is finished, the battery 30 is received in the receiving portion 40 such that the connection terminal 34 of the battery 30 is connected to the connection terminal 44 of the receiving portion 40, the bottom wall 30b of the battery 30 abuts against the supporting portion 45 of the receiving portion 40, and the engaging recessed portion 35 of the battery 30 is engaged with the engaging protrusion portion 46 of the receiving portion 40.

In the expanded state of the mobile base 10, a receiving operation as follows can be performed instead of the receiving operation above. First, a rear-end portion of the battery 30 is inserted in a rear-end portion of the receiving portion 40 through the upper opening 42. The battery 30 may be then turned about the rear-end portion of the battery 30 toward the vehicle lower side while passing through the upper opening 42 such that the front-end portion of the battery 30 approaches the front-end portion of the receiving portion 40.

Next, an operation for removing the battery 30 from the receiving portion 40 will be described. In each of the expanded and contracted states of the mobile base 10, the battery 30 may be removed from the receiving portion 40 through the front opening 41 while moving from the vehicle rear side toward the vehicle front side. At a midway time point of the removing operation, the battery 30 runs onto the engaging protrusion portion 46 or moves while passing through the upper side of the engaging protrusion portion 46. At the time point at which the removing operation is finished, the battery 30 is removed to the outside of the mobile base 10.

In the expanded state of the mobile base 10, a removing operation as follows may be performed instead of the removing operation above. First, the battery 30 is turned about the rear-end portion of the battery 30 toward the vehicle upper side while passing through the upper opening 42 so as to separate the front-end portion of the battery 30 from the front-end portion of the receiving portion 40. Then, the battery 30 can be removed to the outside of the mobile base 10 through the upper opening 42.

As described above, in the electric vehicle according to this Embodiment, the battery 30 is arranged in the front base 13 out of the front and rear bases 13 and 14 of the mobile base 10. Therefore, the space occupied by the battery 30 can be suppressed within the front base 13 in the electric vehicle. As a result, the electric vehicle can be downsized. The receiving portion 40 has the front opening 41 formed in the front-end portion of the front base 13. Therefore, in both the expanded state and the contracted state of the mobile base 10, the battery 30 can be efficiently received in the receiving portion 40 from the vehicle front side toward the vehicle rear side through the front opening 41, and the battery 30 can be efficiently removed from the receiving portion 40 from the vehicle rear side toward the vehicle front side through the front opening 41. Therefore, the battery 30 can be efficiently attached and removed, and the battery 30 can be efficiently charged. Thus, the electric vehicle can be downsized, the battery 30 can be efficiently replaced, and the battery 30 can be efficiently charged.

In the electric vehicle according to this Embodiment, a ratio P2/P1 of the length P2 of the battery overlapping zone 40a in the receiving portion 40 to the length P1 of the base overlapping region 10a in the mobile base 10 is 0.5 or more and less than 1. Therefore, the space occupied by the battery 30 can be further suppressed in the front base 13 of the electric vehicle. As a result, the electric vehicle can be further downsized.

In the electric vehicle according to this Embodiment, the receiving portion 40 is formed in the upper-end portion of the front base 13 and has the upper opening 42 connected to the front opening 41 such that the battery 30 is receivable in the receiving portion 40 and the battery 30 is removable from the receiving portion 40. Therefore, in particular, in the expanded state of the mobile base 10, the battery 30 can be efficiently received in the receiving portion 40 through the front opening 41 in the front-end portion and the upper opening 42 in the upper-end portion of the front base 13, and the battery 30 can be efficiently removed from the receiving portion 40 through the front opening 41 and the upper opening 42.

Second Embodiment

The electric vehicle according to Second Embodiment will be described. The electric vehicle according to this Embodiment is the same as the electric vehicle according to First Embodiment except for the configuration of the receiving portion and the battery, and the method for attaching and removing the battery. A seat and a frame of this Embodiment are the same as the seat and the frame of First Embodiment. Therefore, the description of the seat and the frame of this Embodiment is omitted. A mobile base of this Embodiment is the same as the mobile base of First Embodiment except for the configuration of the receiving portion thereof, and thus, the receiving portion of this Embodiment and components of the mobile base relating to the receiving portion will be mainly described below.

Outline of Electric Vehicle

Figure 8:
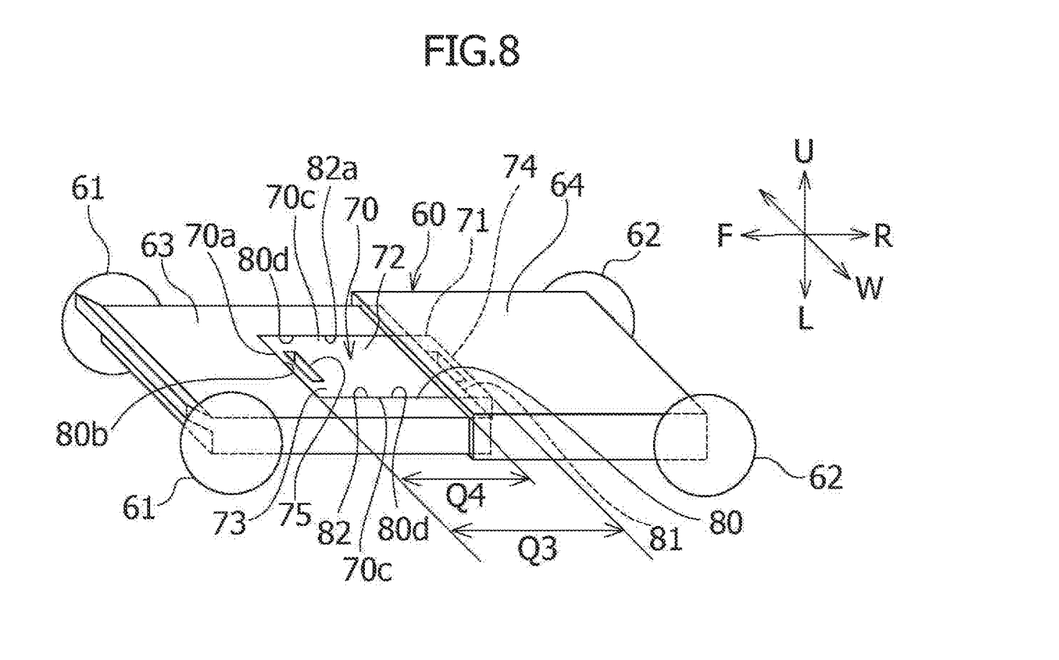
FIG. 8 is a front perspective view schematically showing a mobile base of an electric vehicle according to a Second Embodiment in the expanded state.
Figure 9:
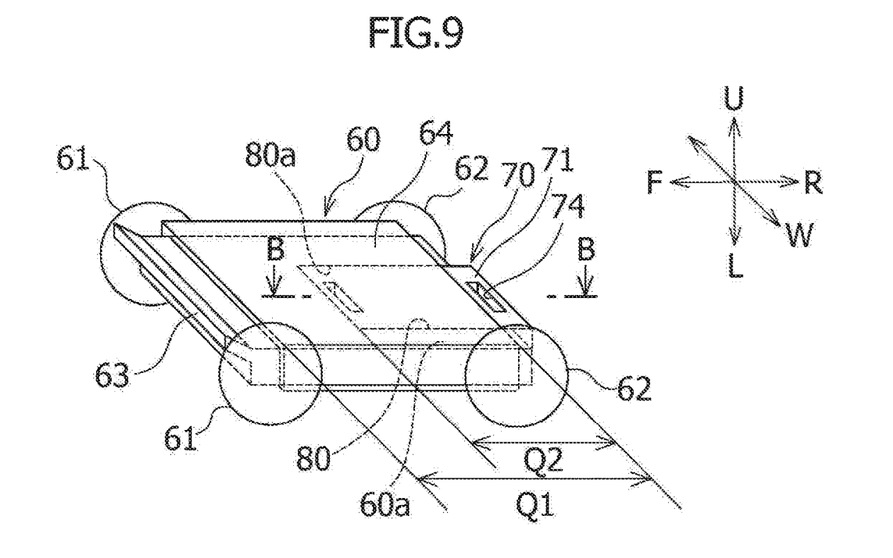
FIG. 9 is a front perspective view schematically showing the mobile base of the electric vehicle according to the Second Embodiment in the contracted state.

The outline of the electric vehicle according to this Embodiment will be described. As shown in FIGS. 8 and 9, the electric vehicle includes a mobile base 60 corresponding to the mobile base 10 in First Embodiment. The mobile base 60 includes front wheels 61, rear wheels 62, a front base 63, and a rear base 64 corresponding to the front wheels 11, the rear wheels 12, the front base 13, and the rear base 14 in First Embodiment respectively. The vehicle includes a battery 70 configured to be capable of supplying electric power used in the electromotive drive.

Figure 10:
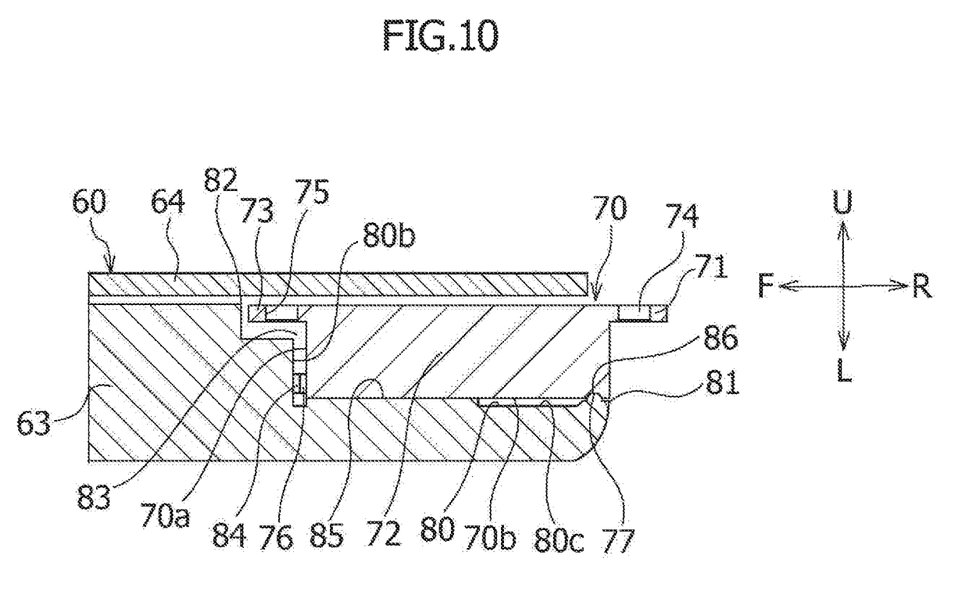
FIG. 10 is a cross-sectional view taken along line B-B in FIG. 9.

As shown in FIGS. 8 to 10, the front base 63 includes a receiving portion 80 that can receive the battery 70. The receiving portion 80 has a rear opening 81 formed in a rear end portion of the front base 63 in the vehicle front-rear direction. The rear opening 81 is formed such that the battery 70 is receivable in the receiving portion 80 and the battery 70 is removable from the receiving portion 80.

The outline of the electric vehicle according to this Embodiment may be configured as follows. As shown in FIG. 9, in the contracted state of the mobile base 60, a base overlapping region 60a in which the front and rear bases 63 and 64 overlap in the vehicle front-rear direction, is provided. The receiving portion 80 includes a battery overlapping zone 80a that overlaps with the base overlapping region 60a in the vehicle front-rear direction in the contracted state of the mobile base 60. A ratio Q2/Q1 of a length Q2 of the battery overlapping zone 80a in the vehicle front-rear direction to a length Q1 of the base overlapping region 60a in the vehicle front-rear direction is 0.5 or more and less than 1. As shown in FIGS. 8 to 10, the battery 70 includes a rear handle portion 71 protruding from a rear-end portion of the rear base 64 in a state in which the battery 70 is received in the receiving portion 80 and in the contracted state of the mobile base 60.

Details of Receiving Portion

In detail, the receiving portion 80 provided in the front base 63 of the mobile base 60 may be configured as follows. As shown in FIGS. 8 to 10, the receiving portion 80 has an upper opening 82. The upper opening 82 is formed in an upper-end portion of the front base 63 in the vehicle upper-lower direction and is connected to the rear opening 81 such that the battery 70 is receivable in the receiving portion 80 and the battery 70 is removable from the receiving portion 80.

As shown in FIG. 9, the rear opening 81 is positioned so as to correspond to the rear-end portion of the rear base 64 in the contracted state of the mobile base 60. In the expanded state of the mobile base 60, the upper opening 82 is positioned on the vehicle front side with respect to a rear base 64 and has an exposed zone 82a exposed to the outside of the mobile base 1. A ratio Q4/Q3 of a length Q4 of the exposed zone 82a in the vehicle front-rear direction to a length Q3 of the upper opening 82 in the vehicle front-rear direction is 0.75 or more and less than 1.

The receiving portion 80 has a cavity 83 formed so as to correspond to the battery 70. The cavity 83 communicates with the outside of the mobile base 60 via the rear opening 81 and the upper opening 82.

The receiving portion 80 has a front side wall 80b positioned on a front end thereof in the vehicle front-rear direction. The receiving portion 80 has a bottom wall 80c positioned on a lower end thereof in the vehicle upper-lower direction. An upper portion of the front side wall 80b in the vehicle upper-lower direction is recessed to the vehicle front side with respect to a lower portion of the front side wall 80b in the vehicle upper-lower direction. The receiving portion 80 has two side walls 80d positioned on both ends thereof in the vehicle width direction respectively. The cavity 83 is defined by the front side wall 80b, the bottom wall 80c, and the two side walls 80d.

As shown in FIG. 10, the receiving portion 80 has a connection terminal 84 that can be electrically connected to a connection terminal 76 of the battery 70 described below. The connection terminal 84 is arranged on a lower portion of the front side wall 80b. The receiving portion 80 has a supporting portion 85 and an engaging protrusion portion 86 protruding to the vehicle upper side from the bottom wall 80c thereof. Although details are described below, the supporting portion 85 supports the battery 70 from the vehicle lower side and the engaging protrusion portion 86 may be engaged with the battery 70. The engaging protrusion portion 86 is positioned more on the vehicle rear side than the supporting portion 85.

Details of Battery

In detail, the battery 70 may be configured as follows. As shown in FIGS. 8 to 10, an upper end surface of the battery 70 in the vehicle upper-lower direction is formed to be substantially coplanar with an upper end surface of the front base 63 in the vehicle upper-lower direction. The rear handle portion 71 of the battery 70 extends to the vehicle front-rear direction. The battery 70 includes a battery main body 72 having a chargeable secondary cell (not shown).

The battery 70 includes a front handle portion 73 protruding from a front-end portion of the battery main body 72 in the vehicle front-rear direction. The front handle portion 73 extends to the vehicle front-rear direction. As shown in FIG. 9, in the expanded state of the mobile base 60, the front handle portion 73 is positioned on the vehicle front side with respect to a front-end portion of the rear base 64 in the vehicle front-rear direction. As shown in FIGS. 8 to 10, the battery 70 has a through hole 74 passing through the rear handle portion 71. The battery 70 has a through hole 75 passing through the front handle portion 73. The through holes 74 and 75 extend in the vehicle width direction. The user can hold the rear handle portion 71 in a state of putting a finger through the through hole 74. The user can hold the front handle portion 73 in a state of putting a finger through the through hole 75.

As shown in FIGS. 8 and 9, the battery 70 has a front side wall 70a positioned on a front end thereof in the vehicle front-rear direction. The front side wall 70a of the battery 70 faces the front side wall 80b of the receiving portion 80 in the vehicle front-rear direction. An upper portion of the front side wall 80b of the receiving portion 80 is recessed to the vehicle front side so as to avoid the front handle portion 73 of the battery 70. The battery 70 has a bottom wall 70b positioned on a lower end thereof in the vehicle upper-lower direction. The bottom wall 70b of the battery 70 faces the bottom wall 80c of the receiving portion 80 in the vehicle upper-lower direction. The bottom wall 70b of the battery 70 configures the bottom wall of the battery main body 72. The battery 70 has two side walls 70c positioned on both ends thereof in the vehicle width direction, respectively. The two side walls 70c of the battery 70 face the two side walls 80d of the receiving portion 80 in the vehicle width direction, respectively.

As shown in FIG. 10, the battery 70 has a connection terminal 76 that can be connected to the connection terminal 84 of the receiving portion 80 of the mobile base 60. The connection terminal 76 is provided on the front side wall 70a of the battery 70. The connection terminal 76 is electrically connected to the secondary cell (not shown) of the battery main body 72. The supporting portion 85 of the receiving portion 80 supports the battery 70 from the vehicle lower side in a state of abutting against the bottom wall 70b of the battery 70. The battery 70 has an engaging recessed portion 77 recessed toward the vehicle upper side from the bottom wall 70b thereof. The engaging recessed portion 77 can be engaged with the engaging protrusion portion 86 of the receiving portion 80 so as to regulate the movement of the battery 70 with respect to the receiving portion 80.

Method for Attaching and Removing Battery

A method for attaching and removing the battery 70 will be described. First, an operation for receiving the battery 70 in the receiving portion 80 will be described. In the contracted state of the mobile base 60, the battery 70 can be received in the receiving portion 80 through the rear opening 81 while moving from the vehicle rear side toward the vehicle front side. At a midway time point of the receiving operation, the battery 70 runs onto the engaging protrusion portion 86 or moves while passing through the upper side of the engaging protrusion portion 86. At the time point at which the receiving operation is finished, the battery 70 is received in the receiving portion 80 such that the connection terminal 76 of the battery 70 is connected to the connection terminal 84 of the receiving portion 80, the bottom wall 70b of the battery 70 abuts the supporting portion 85 of the receiving portion 80, and the engaging recessed portion 77 of the battery 70 is engaged with the engaging protrusion portion 86 of the receiving portion 80.

In the expanded state of the mobile base 60, a rear-end portion of the battery 70 is first inserted in a rear-end portion of the receiving portion 80 through the exposed zone 82a of the upper opening 82. Then, the battery 70 is turned about the rear-end portion of the battery 70 toward the vehicle lower side while passing through the exposed zone 82a of the upper opening 82 such that the front-end portion of the battery 70 approaches a front-end portion of the receiving portion 80.

Next, an operation for removing the battery 70 from the receiving portion 80 will be described. In the contracted state of the mobile base 60, the battery 70 can be removed from the receiving portion 80 through the rear opening 81 while moving from the vehicle front side toward the vehicle rear side. At a midway time point of the removing operation, the battery 70 runs onto the engaging protrusion portion 86 or moves while passing through the upper side of the engaging protrusion portion 86. At the time point at which the removing operation is finished, the battery 70 is removed to the outside of the mobile base 60.

In the expanded state of the mobile base 60, first, the battery 70 is turned about the rear-end portion of the battery 70 toward the vehicle upper side while passing through the exposed zone 82a of the upper opening 82 such that the front-end portion of the battery 70 is separated from the front-end portion of the receiving portion 80. The battery 70 can then be removed to the outside of the mobile base 60 through the exposed zone 82a of the upper opening 82.

As described above, in the electric vehicle according to this Embodiment, the battery 70 is arranged in the front base 63 out of the front and rear bases 63 and 64 of the mobile base 60. Therefore, the space occupied by the battery 70 can be suppressed within the front base 63 in the electric vehicle. As a result, the electric vehicle can be downsized. The receiving portion 80 has the rear opening 81 formed in a rear-end portion of the front base 63. Therefore, in the contracted state of the mobile base 60, the battery 70 can be efficiently received in the receiving portion 80 from the vehicle rear side toward the vehicle front side through the rear opening 81 in the rear-end portion of the front base 63 on the rear-end portion side of the rear base 64, and the battery 70 can be efficiently removed from the receiving portion 80 from the vehicle front side toward the vehicle rear side through the rear opening 81 in the rear-end portion of the front base 63 on the rear-end portion side of the rear base 64. Therefore, the battery 70 can be efficiently attached and removed, and the battery 70 can be efficiently charged. Thus, the electric vehicle can be downsized, the battery 70 can be efficiently replaced, the battery 70 can be efficiently charged.

In the electric vehicle according to this Embodiment, the ratio Q2/Q1 of the length Q2 of the battery overlapping zone 80a in the receiving portion 80 to the length Q1 of the base overlapping region 60a in the mobile base 60 is 0.5 or more and less than 1. Therefore, the space occupied by the battery 70 can be further suppressed in the front base 63 in the electric vehicle. As a result, the electric vehicle can be further downsized.

In the electric vehicle according to this Embodiment, the battery 70 includes the rear handle portion 71 protruding from the rear-end portion of the rear base 64 in a state in which the battery 70 is received in the receiving portion 80 and in the contracted state of the mobile base 60. Therefore, in the contracted state of the mobile base 60, the battery 70 can be efficiently removed from the receiving portion 80 through the rear opening 81 on the rear-end portion side of the rear base 64 with use of the rear handle portion 71.

The Embodiments of the present invention have been described above, but the present invention is not limited to the Embodiments described above, and the present invention can be modified and changed based on the technical idea thereof.

REFERENCE SIGNS LIST

10 • • • Mobile base, 10a • • • Base overlapping region, 11 • • • Front wheel, 12 • • • Rear wheel, 13 • • • Front base, 14 • • • Rear base, 20 • • • Seat, 21 • • • Sitting surface, 22 • • • Seating portion, 30 • • • Battery, 40 • • • Receiving portion, 40a • • • Battery overlapping zone, 41 • • • Front opening, 42 • • • Upper opening, 60 • • • Mobile base, P1, P2 • • • Length, P2/P1 • • • Ratio, 60 • • • Mobile base, 60a • • • Base overlapping region, 61 • • • Front wheel, 62 • • • Rear wheel, 63 • • • Front base, 64 • • • Rear base, 70 • • • Battery, 71 • • • Rear handle portion, 80 • • • Receiving portion, 80a • • • Battery overlapping zone, 81 • • • Rear opening, Q1, Q2 • • • Length, Q2/Q1 • • • Ratio, H • • • Wheelbase

The invention claimed is:

1. An electric vehicle comprising:
a mobile base configured to be capable of traveling by an electromotive drive;
a seat arranged on the mobile base and including a seating portion having a sitting surface; and
a battery configured to be capable of supplying electric power used in the electromotive drive,
wherein the mobile base includes: a front base having a front wheel; and a rear base arranged rearward of the front base and having a rear wheel,
the front and rear bases are configured to be moveable relative to each other such that the mobile base is changeable between: an expanded state that a wheelbase between the front wheel and the rear wheel is expanded; and a contracted state that the wheelbase is more contracted than in the expanded state,
the front base includes a receiving portion capable of receiving the battery,
the receiving portion has a front opening formed in a front-end portion of the front base or a rear opening formed in a rear-end portion of the front base, and
the front opening or the rear opening is formed such that the battery is receivable in the receiving portion and the battery is removable from the receiving portion,
a base overlapping region that the front and rear bases overlap in a front-rear direction is provided in the contracted state,
the receiving portion includes a battery overlapping zone overlapping with the base overlapping region in the front-rear direction in the contracted state, and
a ratio of a length of the battery overlapping zone in the front-rear direction to a length of the base overlapping region in the front-rear direction is 0.5 or more and less than 1.

2. The electric vehicle as claimed in claim 1, wherein the receiving portion has the front opening, and the receiving portion has an upper opening formed in an upper-end portion of the front base and connected to the front opening such that the battery is receivable in the receiving portion and the battery is removable from the receiving portion.

3. The electric vehicle as claimed in claim 1, wherein the receiving portion has the rear opening, and the battery includes a rear handle portion protruding from a rear-end portion of the rear base in a state that the battery is received in the receiving portion and in the contracted state of the mobile base.

* * * * *